Patented Apr. 13, 1926.

1,580,795

UNITED STATES PATENT OFFICE.

SAMUEL E. SHEPPARD AND LEON W. EBERLIN, OF ROCHESTER, NEW YORK, ASSIGNORS TO EASTMAN KODAK COMPANY, OF ROCHESTER, NEW YORK, A CORPORATION OF NEW YORK.

ELECTRODEPOSITION OF ORGANIC MATERIALS.

No Drawing. Application filed June 8, 1925. Serial No. 35,613.

*To all whom it may concern:*

Be it known that we, SAMUEL E. SHEPPARD and LEON W. EBERLIN, a subject of the King of Great Britain and a citizen of the United States of America, respectively, residing at Rochester, in the county of Monroe and State of New York, have invented certain new and useful Improvements in Electrodeposition of Organic Materials, of which the following is a full, clear, and exact specification.

This invention relates to the electrodeposition of organic materials from aqueous suspensions or emulsions thereof. One object of the invention is to provide such a process in which the liberation of oxygen at the anode will be wholly or partially counteracted. Another object of the invention is to provide such a process in which the oxygen at the anode is chemically combined, as it is formed, so as to prevent mechanical imperfections in the deposit, which might be caused by gas bubbles. Still another object of the invention is to provide such a process in which the chemical combination of the oxygen will give rise to sulfur compounds which are combinable or compatible with the deposited material. Another object of the invention is to provide a process for the electrodeposition of rubber from aqueous emulsions thereof in which the rubber is deposited in smooth continuous coats, substantially free from pits and other imperfections caused by evolved gases at the anode. Other objects will hereinafter appear.

This invention is applicable to the electrodeposition of various organic materials from aqueous emulsions thereof, such as rubber, cellulose nitrate, cellulose acetate, cellulose ether, etc. Since our process is very useful in connection with the electrodeposition of rubber, we shall describe an example of it in connection with such deposition. But it will be understood that our invention is not restricted to this example, except as indicated in the appended claims.

When rubber, or an equivalent organic material, is deposited from electroconducting aqueous emulsions thereof upon an anode, the deposition may be hastened by using high current densities. But the latter cause gases, like oxygen, to be liberated at the anode, this being a so-called non-attackable electrode. Bubbles of gases may interfere with the collecting of the rubber particles on the anode surface and thus cause weak spots or pits in the deposit.

We have found that the defects caused by such evolved gases may be wholly or substantially avoided by chemically combining the oxygen at the time when it tends to be electrolytically liberated. This removal of the oxygen is effected by means of a reducing agent. In the preferred form of our invention this reducing agent is a sulfur compound which, when it reacts with the oxygen, releases products which are compatible with the deposited material and with the emulsion. Take for example, the process of depositing rubber from an emulsion thereof which is disclosed in our prior Patent No. 1,476,374, Dec. 4, 1923, for electrodeposition of rubber coatings. We add to the emulsion disclosed therein suitable reducing agents such as sodium or ammonium sulfite or thiosulfate or hydrosulfite. These sulfo-bodies do not impair the emusion, but combine with the oxygen at the anode to form polythionates which assist in maintaining dispersion of colloidal sulfur in the emulsion and may enter the deposited coating of rubber without impairing the latter. In fact, any such sulfur bodies trapped in the coating will, to a certain extent, assist in the vulcanization of the latter when this operation is later carried out. The conditions and technique of the plating operation are essentially those described in the above cited patent. The concentration of the reducing substance in the emulsion can be widely varied, in accordance with the amount of oxygen which is liable to be evolved at the anode. The adjustment of such concentration is readily selected by the operator.

While we prefer to employ the simple inorganic reducing agents, indicated in the above example, we have, nevertheless, found that organic reducing substances, compatible with the emulsion and the deposit, are useful. Thus, for instance, we may use hydrochinon, resorcin, phenolic amines and the like. We may even employ dye-forming bodies which readily oxidize to colored compounds. These are then deposited with the rubber and color the same. Catalyzers which assist the combination of the oxygen with the reducer may also be present, such as ceric salts and manganous salts. But in the preferred form of our process we use the simple inorganic substances enumerated above, or alkaline sulfides and polysulfides, which upon oxidation at the anode furnish colloidal sulfur. A supply of de-oxidizing sulfide or sulfhydrate ion may in particular be conveniently obtained by keeping the alkaline rubber dispersion just saturated with hydrogen sulfide gas.

Having thus described our invention, what we claim as new and desire to secure by Letters Patent is:

1. The process of depositing an organic material on an electroconducting surface of an object, comprises the steps of bringing said surface into contact with an electroconducting aqueous emulsion of said material, said emulsion containing a reducing agent compatible with said emulsion and with a deposit formed therefrom, and passing a depositing electric current through said surface and emulsion, the current density being one that tends to liberate oxygen at the anode.

2. The process of depositing rubber on to an anode surface, which comprises bringing said surface into contact with an electroconducting rubber emulsion containing a reducing agent which is compatible with said rubber and said emulsion, and passing a depositing electric current through said anode surface and emulsion under conditions tending to liberate oxygen.

3. The process of depositing rubber on an anode surface, which comprises the steps of bringing said surface into contact with an electroconducting rubber emulsion containing a reducing sulfur compound, compatible with said emulsion and with rubber deposited therefrom, and passing a depositing electric current through said anode surface and said emulsion.

Signed at Rochester, New York, this 2nd day of June 1925.

SAMUEL E. SHEPPARD.
LEON W. EBERLIN.